(12) United States Patent
Häring et al.

(10) Patent No.: US 8,079,480 B2
(45) Date of Patent: Dec. 20, 2011

(54) MODIFICATION OF DRAWN FILM

(76) Inventors: Thomas Häring, Stuttgart (DE); Rima Häring, Stuttgart (DE)

( * ) Notice: Subject to any disclaimer, the term of this patent is extended or adjusted under 35 U.S.C. 154(b) by 572 days.

(21) Appl. No.: 10/477,174

(22) PCT Filed: May 13, 2002

(86) PCT No.: PCT/EP02/05256
§ 371 (c)(1),
(2), (4) Date: Jan. 9, 2004

(87) PCT Pub. No.: WO02/092673
PCT Pub. Date: Nov. 21, 2002

(65) Prior Publication Data
US 2004/0191522 A1  Sep. 30, 2004

(30) Foreign Application Priority Data
May 11, 2001 (DE) .................................. 101 22 814

(51) Int. Cl.
*B01D 71/02* (2006.01)
*B01D 71/26* (2006.01)
*B01D 71/00* (2006.01)

(52) U.S. Cl. ......... 210/500.21; 210/500.25; 210/500.36; 210/502.1

(58) Field of Classification Search ........................ None
See application file for complete search history.

(56) References Cited

U.S. PATENT DOCUMENTS

| | | | |
|---|---|---|---|
| 4,791,144 A * | 12/1988 | Nagou et al. | ............ 521/90 |
| 4,842,741 A | 6/1989 | Coughlin et al. | |
| 5,229,465 A | 7/1993 | Tsuchida et al. | |
| 5,498,339 A * | 3/1996 | Creusen et al. | ............ 210/644 |
| 5,670,051 A | 9/1997 | Pinnau et al. | |
| 5,690,949 A * | 11/1997 | Weimer et al. | ............ 424/402 |
| 5,744,183 A | 4/1998 | Ellsworth et al. | |
| 6,187,196 B1 | 2/2001 | Way et al. | |
| 6,468,331 B2 * | 10/2002 | Kang et al. | ............ 96/12 |
| 6,953,510 B1 * | 10/2005 | Mackay et al. | ............ 156/229 |

FOREIGN PATENT DOCUMENTS

| | | |
|---|---|---|
| CA | 1 207 398 A | 7/1986 |
| DE | 199 29 482 A1 | 3/2001 |
| EP | 0335614 A2 * | 4/1989 |

OTHER PUBLICATIONS

Derwent Abstract Acc-No. 1999-288712, "Inorganic particle filled polymer separation membrane", Tianjin Textile Eng. (cited as "x" reference in the PCT application.*

* cited by examiner

*Primary Examiner* — Krishnan S Menon
(74) *Attorney, Agent, or Firm* — Haynes and Boone, LLP (57) ABSTRACT

The Invention relates to a drawn polymer film, comprising (A) a polymer or polymer blend and at least (B) one additional component with an average particle diameter of between 0.1 and 15 µm, which by means of (C) one or several secondary treatment steps is processed to form a membrane after being drawn. The average particle diameter of component (B) ranges between 0.1 and 15 µm, preferably 0.5-8.0 µm, with the range between 1.0 and 7.0 µm being particularly preferred. The membranes are used for alkene-alkane separation, electrodialysis, the desalinisation of seawater, in fuel cell applications and other membrane applications.

46 Claims, 2 Drawing Sheets

MODIFICATION OF DRAWN FILM

1. STATE-OF-THE-ART

Already since more than 20 years stretched films are used in technology.

Polypropylene or polyethylene films formed by extrusion are widely used in applications such as food packaging, food container and the like. Stretched polypropylene films, particularly biaxially stretched polypropylene films are widely used in packaging materials for their excellent mechanical and optical properties. They are produced generally by successive biaxial stretching using a tenter.

Recently stretched foils with inorganic bulking agents are used as breathable foils for diaper film. The pore diameter of commonly employed, very economical films however is too big by orders of magnitude, in that these foils could find use for applications which require dense membranes, such as for use in a fuel cell.

2. OBJECT OF THE PRESENT INVENTION

It is the object of the present invention to produce economically membranes based on stretched films.

3. DESCRIPTION OF THE INVENTION

The present invention concerns membranes based on stretched films.

The above task can be resolved according to the present invention by a stretched polymer film, comprising (A) a polymer or polymer blend and at least (B) another component with an average particle diameter of 0.1 to 15 µm, which (C) by one or more posttreatment steps is processed after the stretching to a membrane.

It has now been found that you cannot process without the stretching the foil consisting of the polymer (A) and the particle-shaped component (B), at the same posttreatment steps (C) to a membrane with the same properties.

The average particle diameter of the component (B) is in the range of 0.1-15 µm. Preferred is 0.5-8.0 µm and particularly preferred is the range of 1.0-7.0 µm. If the diameter is smaller than 0.1 µm, a secondary agglomeration results and the resulting particles have partly big diameters which usually lead to a tearing of the foil in the stretching process. With regard to the form of the particles there is no special restriction. However, spherical particles are preferred.

Before the stretching the amount of the component (B) of the non-stretched foil is 2 to 80% by weight, 10 to 70% by weight are preferred and 20 to 60% by weight are preferred particularly. The weight proportion of the polymer component (A) is correspondingly 98 to 20% by weight before the stretching, 90 to 30% by weight are preferred and 80 to 40% by weight are preferred particularly.

There is no particular restriction as to the method by which the particle-shaped component (B) is incorporated into the polymer component (A). Said method includes a simple mixing method. The mixing process can be carried out by adding the component (B) into the melted component (A). The mixing process can take place by use of a screw extrusion kneader (e.g. a single-screw extruder or a twin-screw extruder), a Banbury mixer, a continuous mixer, a mixing roll, or the like. When the component (A) can not be melted or when it is not desired, it is dissolved in a suitable solvent or solvent mixture. Suitable is any solvent that dissolves the component (A) and which is at the same time not a solvent for the component (B). Preferred solvents are water and aprotic solvents, such as tetrahydrofurane (THF), dimethylsulfoxide (DMSO), N-methylpyrrolidone (NMP), sulfolane and dimethylacetamide (DMAc). The component (B) is then finely dispersed in the dissolved component (A).

In all cases of the mixing process a composite results.

With the use of solvents these must be removed again after drawing of a film on a suitable underlay in a drying or precipitation process. This is state-of-the-art and for example described in PCT/EP 00/03910 and WO 01/87992. The received foil represents a composite foil or composite membrane. The component (B) is dispersed in the matrix of the component (A).

If the crystallinity of the used polymer in the non-stretched film is so great that the film in the dried state can not be stretched, then the solvent is not completely removed. It was surprisingly noticed that foils consisting of the components (A) and (B) which were produced by a solvent process with a following drying process and which are not stretchable in the dried state are very well stretchable without destruction with a residual solvent concentration. The stretching is carried out after this in a temperature range which is over the melting point and below the boiling point of the solvent remaining into the membrane. Another solvent-free stretching process can follow this stretching procedure.

The residual solvent concentration of the non-stretched foil is between 2 and 30% by weight, particularly preferred is the range between 5 and 20% by weight of solvent in the non-stretched foil.

The stretched composite film of the present invention may be subjected as necessary before or after the follow-up treatment (C) to surface treatments, such as corona discharge, plasma treatment, and the like, at one or both sides. The stretched composite film of the present invention may be coated or laminated before or after the post treatment (C) on one or both two sides with solvent or solvent-free with a layer of a polymer or a polymer mixture which carries if necessary functional groups. Indicate functional groups.

In the case, that the component (A) can be melted indestructibly, the stretched film containing the components (A) and (B), not yet posttreated with the procedure (C), can be produced by a known process without any restriction. The production of a stretched composite film can be conducted, for example, by a process which comprises subjecting a composition of a fusible component (A), containing an at the same temperature not fusible particle-shaped component (B) to melt extrusion by a T-die method and passing the extrudate through a cooling roll, combined with an air-knife or through nip rolls to form a film. The production of a biaxially stretched film by successive biaxial stretching using a tenter is preferably conducted by a process which comprises forming a sheet or film from the above-mentioned composition by a T-die method, an inflation method or the like, then feeding the sheet or film into a longitudinal stretching machine to conduct longitudinal stretching of 0.5- to 10-fold (expressed as a mechanical draw ratio). at a heating roll temperature of 100-380° C., preferred 120-350° C. and particularly preferred 130-250° C., and subjecting the monoaxially stretched film to transversal stretching of 0.5- to 15-fold by the use of a tenter at a tenter temperature of 100-380° C., preferred 120-350° C. and particularly preferred 130-250° C. The resulting biaxially stretched film is further subjected, as necessary, to a heat treatment of 80-380° C. (in this heat treatment a transverse relaxation of 0-25% is allowed). Of course, further stretching may be conducted after the above stretching. In the longitudinal stretching, it is possible to combine multi-stage stretching, rolling, drawing, etc. Monoaxial stretching alone may be adopted to obtain a stretched film.

Figure 1:
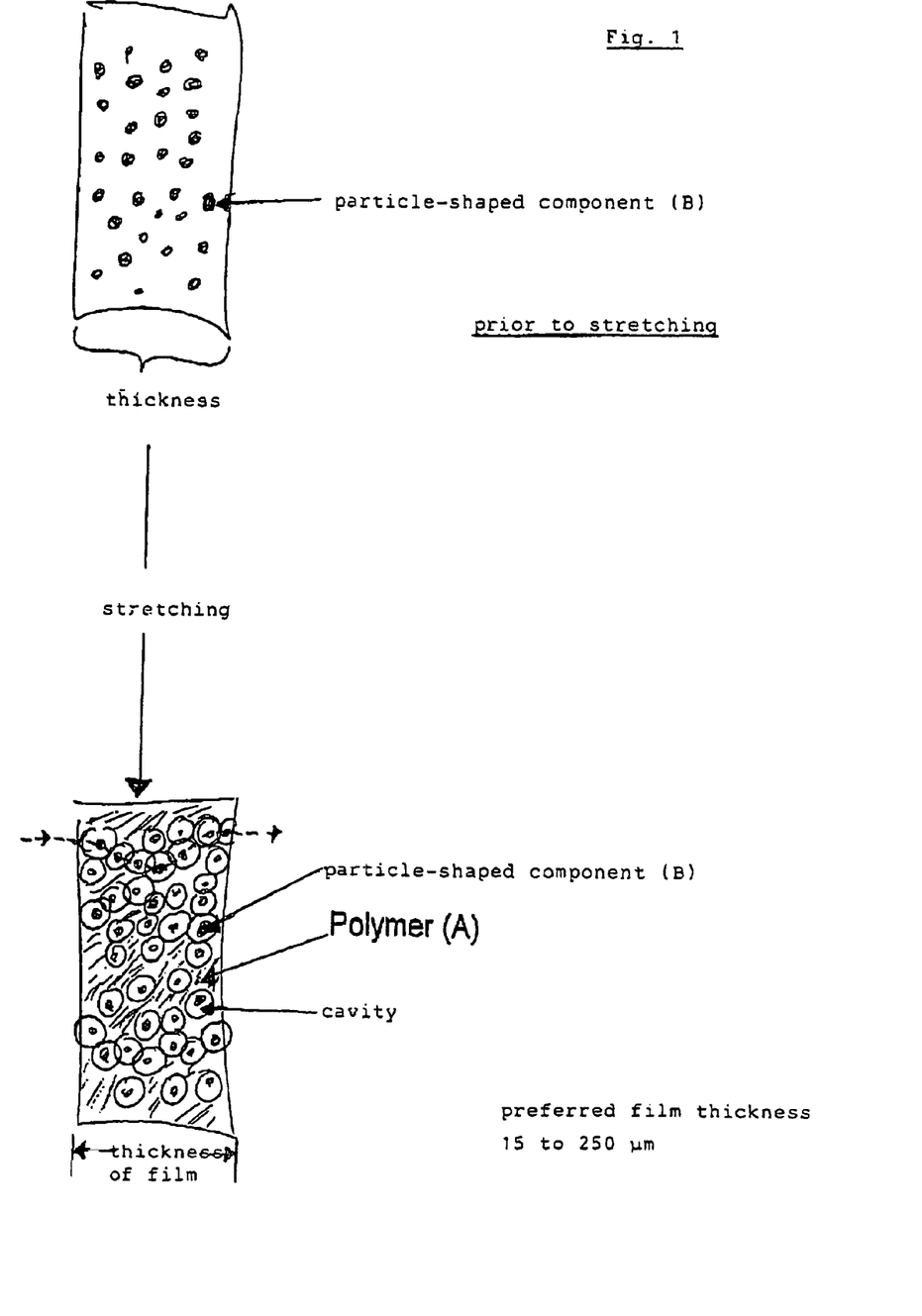
FIG. 1 shows a process for forming a drawn composite film having particle components and pores or cavity formed around the particle components, in accordance with the present invention.

The particle-shaped component (B) can be organic or inorganic. It is condition for the particle-shaped component (B) that an opening or a void space forms around the preferably spherical particle in the following stretching process (illus. 1). The preferably spherical particle is after the stretching process in a cavity or at an appropriate thickness of the film a pore has formed around the particle-shaped component (B). If sufficient cavities border on each other and their cross-sections overlap, a continuous way or path from one side of the film to the other side results, what, at long last, represents again a pore, too. The component (B) remains after the stretching in the film.

A second path is created in the film through the stretching. The first path or the first phase represents the polymer (A) himself of which the film consists. The second path or phase is the cavities which have arisen from the stretching procedure. The particle-shaped component (B) is in the cavities. A continuous phase from one side to the other shall be understood as a path. A real percolation must be possible so that the way or the phase is continuous. That is a permeating substance, a liquid (e.g. water), a gas or ion must be able to penetrate from one side to the other side. If the cavity is filled, then the properties of the new path are dependent on the "filler". If the filler is ion conducting, then the complete path is ion conducting. It is important that the path is continuous.

All inorganic substances which form layer structures or framework structures are particularly preferred as particle-shaped component (B). Phyllosilicates and/or tectosilicates are particularly preferred. All synthetic and natural zeolites are preferred from the tectosilicates.

If the inorganic component (B) is a phyllosilicate, it is based on montmorillonite, smectite, illite, sepiolite, palygorskite, muscovite, allevardite, amesite, hectorite, talc, fluorhectorite, saponite, beidellite, nontronite, stevensite, bentonite, mica, vermiculite, fluorvermiculite, halloysite, fluorine containing synthetical talc types or blends of two, or more of the above-mentioned phyllosilicates. The phyllosilicate can be delaminated or pillared. Particularly preferred is Montmorillonite. Furthermore preferred is the protonated form of the phyllosilicates and/or tectosilicates.

In one embodiment of the invention the component (B) which includes layer structures and/or framework structures gets functionalised before the stretching and/or after the stretching. If the functionalisation happens after the stretching, then it is a part of the post treatment (C). In a preferred embodiment the phyllosilicates and/or tectosilicates get functionalised before or after the stretching.

Description of the Functionalized Phyllosilicate:

The term "a phyllosilicate" in general means a silicate, in which the $SiO_4$ tetraeders are connected in two-dimensional infinite networks. (The empirical formula for the anion is $(Si_2O_5^{2-})_n$). The single layers are linked to one another by the cations positioned between them, which are usually Na, K, Mg, Al or/and Ca in the naturally occurring phyllosilicates.

By the term "a functionalized phyllosilicate or tectosilicate" we understand phyllosilicates or tectosilicates in which the layer distances are at first increased via a intercalation of molecules by reaction with so-called functionalisation agents. The layer thickness of such silicates before delamination of molecules carrying functional groups is preferably 0.5 to 10 nm, more preferably 0.5 to 5 and most preferably 0.8 to 2.

To functionalise the phyllosilicates or tectosilicates, they are reacted (before or after production of the composites according to the invention) with so-called functionalizing hydrophobisation agents which are often also called onium ions or onium salts. The insertion of organic molecules often has a hydrophobisation of the silicates as a consequence, too. The expression functionalising hydrophobisation agents is therefore used here.

The cations of the phyllosilicates or tectosilicates are replaced by organic functionalising hydrophobisation agents in which by the nature of the organic rest the desired chemical functionalisation can be adjusted inside and/or at the surface of the silicate. The chemical functionalisation depends on the kind of the respective functionalising molecule, oligomer or polymer, which is to be incorporated into the phyllosilicate.

The exchange of the cations usually of metal ions or protons can be complete or partial. A complete exchange of the cations, metal ions or protons is preferred. The quantity of the exchangeable cations, metal ions or protons is usually expressed as milli equivalent (meq) per 1 g of phyllosilicate or tectosilicate and is referred to as ion exchange capacity.

Preferred are phyllosilicates or tectosilicates having a cation exchange capacity of at least 0.5, preferably 0.8 to 1.3 meq/g.

Suitable organic functionalising hydrophobisation agents are derived from oxonium, ammonium, phosphonium and sulfonium ions, which may carry one or more organic residues.

As suitable functionalising hydrophobisation agents those of general formula I and/or II are mentioned:

Where the substituents have the following meaning:
R1, R2, R3, R4 are independently from each other hydrogen, a straight chain, branched, saturated or unsaturated hydrocarbon radical with 1 to 40, preferably 1 to 20 C atoms, optionally carrying at least one functional group or 2 of the radicals are linked with each other, preferably to a heterocyclic residue having 5 to 10 C atoms, more preferably having one or more N atoms.
X represents phosphorous, nitrogen or carbon,
Y represents oxygen, sulfur or carbon,
n is an integer from 1 to 5, preferably 1 to 3 and
Z is an anion.

In case that Y represents carbon, one of the radicals R1, R2 or R3 is double bonded to this carbon.

Suitable functional groups are hydroxyl, nitro, phosphonic acid or sulfonic acid groups, whereas carboxyl and sulfonic acid groups are especially preferred. In the same way sulfonic acid chloride and carboxylic acid chlorides are especially preferred.

Suitable anions Z are derived from proton providing acids, in particular mineral acids, wherein halogens such as chlorine, bromine, fluorine, iodine, sulfate, sulfonate, phosphate, phosphonate, phosphite and carboxylate, especially acetate are preferred.

The phyllosilicates and/or tectosilicates used as starting materials are generally reacted as a suspension. The preferred suspending agent is water, optionally mixed with alcohols, especially lower alcohols having 1 to 3 carbon atoms. If the functionalizing hydrophobisation agent is not water-soluble, then a solvent is preferred in which said agent is soluble. In such cases, this is especially an aprotic solvent. Further examples for suspending agents are ketones and hydrocarbons. Usually a suspending agent miscible with water is preferred. On addition of the hydrophobizing agent to the phyllosilicate, ion exchange occurs whereby the phyllosilicate usually precipitates from the solution. The metal salt resulting as a by-product of the ion exchange is preferably water-soluble, so that the hydrophobized phyllosilicate can be separated as a crystalline solid, for example, by filtration. When the functionalisation takes place after the stretching in the film, of course the phyllosilicate or tectosilicate is available as a solid before the functionalisation. The cation exchange is made by secondary treatment of the stretched film in a solution containing the functionalising substances. The removal of the cations originally bound to the silicate is carried out either with the same solvent or with a suitable other solvent in a second step. It is also possible to fix the cations originally bound to the silicate as a solid, particularly as a hardly soluble salt in and at the silicate surface. This is frequently the case when the cation bound originally at the silicate is a two, three or quadrivalent cation, particularly metal cation. Examples of it are Ti4+, Zr4+, ZrO2+ and TiO2+.

The ion exchange is mostly independent from the reaction temperature. The temperature is preferably above the crystallization point of the medium in which the functionalising substances are, and below the boiling point thereof. For aqueous systems the temperature is between 0 and 100° C., preferably between 40 and 80° C.

As functionalising substances alkylammonium ions are preferred, in particular if as a functional group additionally a carboxylic acid chloride or sulfonic acid chloride is present in the same molecule. The alkylammonium ions can be obtained via usual methylation reagents such as methyl iodide. Suitable ammonium ions are alpha-omega-aminocarboxylic acids, especially preferred are Amino-alkyl-aryl-sulfohalide    $R_3$N-alkyl-aryl-$SO_2$X
X=Cl; Br; J; F Amino-alkyl-aryl-sulfonic acids, Me=metal or H or $ZrO^{2+}$ or $TiO^{2+}$
and the omega-alkyl-amino-sulfonic acids. $R_3^+$N-alkyl-$SO_3$H/Me$^{+1/+2/+3/+4}$

The alpha-omega-amino-aryl-sulfonic acids $R_3^+$N-aryl-$SO_3$Me$^{+1/+2/+3/+4}$ Me=metal or H or $ZrO^{2+}$ or $TiO^{2+}$
and the alpha-omega-alkyl-amino-sulfonic acid halides
$R_3^+$N-alkyl-$SO_2$X X=F; Cl; Br; J Additional preferred ammonium ions are pyridine and laurylammonium ions. After functionalisation the layer distance of the phyllosilicates is in general between 1 to 5 nm, preferably 1.3 to 4 nm.

The hydrophobised and functionalised phyllosilicate is freed of water by drying. In general a thus treated phyllosilicate still contains a residual water concentration of 0-5% by weight of water. The functionalised phyllosilicate can then be mixed as a suspension in a suspending agent as anhydrous as possible with the mentioned polymers and be reprocessed to a film. In case the extrusion is chosen to obtain the non-stretched foil, the functionalised phyllosilicate or tectosilicate can be added to the melt. Preferred is the addition of unmodified phyllosilicates or tectosilicates to the melt and a functionalisation of the silicates after the stretching. This is especially preferred if the extrusion temperature lies over the destruction temperature of the functionalising substances.

An especially preferred functionalisation of the tectosilicates and/or phyllosilicates is carried out with modified dyes or their precursors, particularly with triphenyl methane dyes. They have the general formula:

In the present invention dyes are used which are derived from the following basic structure:

The radicals R can be independently of each other hydrogen, a group showing 1 to 40 carbon atoms, preferably a branched or non branched alkyl, cycloalkyl- or an optionally alkylated aryl group, these contain if necessary one or more flourine atoms. The radicals R can correspond independently of each other to the radicals R1, R2, R3 or R4 with the functional groups from the general formula (I) and (II) mentioned above for functionalising hydrophobation agents.

Figure 2:
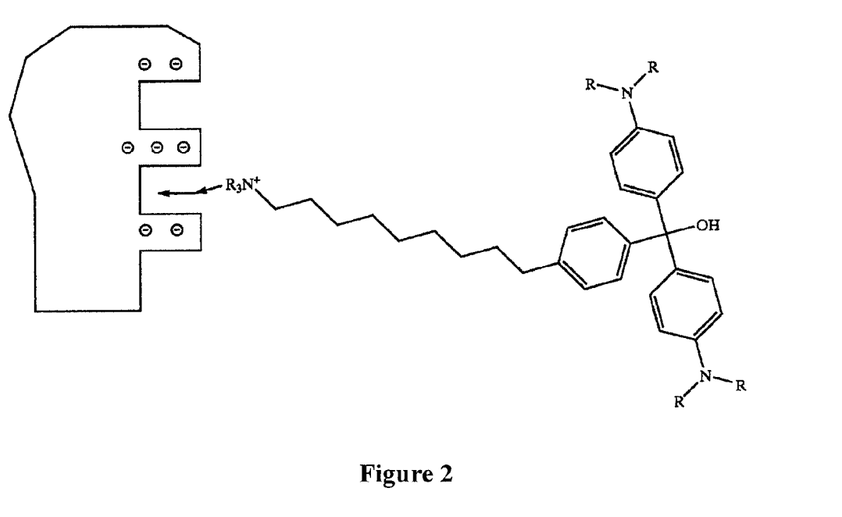
FIG. 2 shows schematically intercalation of a dye molecule into the cavities of a phyllosilicate particle.

To functionalise the phyllosilicate, the dye or its reduced precursor is reacted with the silicate in an aprotic solvent (e.g. tetrahydrofurane, DMAc, NMP). After approx. 24 hours the dye or the precursor is intercalated into the cavities of the phyllosilicate. The intercalation must be such, that an ion conducting group is located on the surface of the silicate particle.

FIG. 2 shows schematically the process.

The so functionalised phyllosilicate is added as a supplement to the polymer solution as described in application DE10024575.7. The functionalisation of the phyllosilicates or tectosilicates can be again carried out via a cation exchange in the stretched film. It has proved to be especially favourable to use the preliminary stage of the dyes. The actual dyes are formed by separation of water only in a following oxidation by an acidic secondary treatment.

It was surprisingly noticed in the case of the triphenyl methane dyes that a proton conductivity is supported in the membranes produced from that. Whether it even is an anhydrous proton conductivity cannot be said with sufficient safety. When the dyes are not bound to the silicate so they are present in a free form inside the stretched membrane, they bleed out already after short time with the reaction water in the fuel cell.

According to the invention the polymer mixtures containing sulfinate groups of the above mentioned parent application, especially preferably the thermoplastic functionalized polymers (ionomers) are added to the suspension of the hydrophobised phyllosilicates. This can be done using already dissolved polymers or the polymers are dissolved in the suspension itself. Preferably the ratio of the phyllosilicates is between 1 and 70% by weight, more preferably between 2 and 40% by weight and most preferably between 5 and 15% by weight.

Another improvement compared with the parent application is the additional addition of zirconium oxychloride (ZrOCl2) in the membrane polymer solution and in the cavities of the phyllosilicates and/or tectosilicates. If the secondary treatment of the membrane is carried out in phosphoric acid, hardly soluble zirconium phosphate is then precipitated in an immediate proximity of the silica particle in the membrane. Zirconium phosphate exhibits a self-proton conductivity in the operation of the fuel cell. The proton conductivity functions by formation of hydrogen phosphates as intermediate steps and is state-of-the-art. The selective incorporation in a direct proximity to a water reservoir (silicates) is new.

The stretched, micro porous film containing a particle-shaped component (B) is subjected according to the present invention one or more secondary treatments (C). In a special embodiment of the invention, the micro porous foil contains phyllosilicates and/or tectosilicates. These will be functionalised now in one or several steps.

If the functionalised bulking agent, particularly zeolites and representatives of the beidellite group and bentonites, is the only ion conducting component, then its weight proportion is generally between 5 to 80%, preferably between 20 and 70% and most preferably in the range of 30 to 60% weight.

The polymers components of the component (A) of the composite membranes of the present invention are defined as follows:

(1) Main chains (backbones) of the polymer of the present invention: Actually all polymers are possibly as polymer main chains. Preferred as main chains are, however:

Polyolefines like polyethylene, polypropylene, polyisobutylene, polynorbonene, polymethylpentene, poly(1,4-isoprene), poly(3,4-isoprene), poly(1,4-butadiene), poly(1,2-butadiene)

Styrene(co)polymer like polystyrene, poly(metylstyrene), poly(($\alpha,\beta,\beta$-trifluorostyrene), poly (pentaflourostyrene) perflourinated ionomer like Nafion® or the $SO_2$Hal-precursor of Nafion® (Hal=F Cl, Br, I), Dow® membrane, GoreSelect® membrane.

N-basic polymer like polyvinylcarbazole, polyethyleneimine, poly(2-vinylpyridine), poly(3-vinylpyridine), poly (4-vinylpyridine)

(Het) aryl main chain polymers which contain the structural patterns listed in illus. 1. (Het) aryl main chain polymers are preferred particularly as:

Polyetherketones like polyetherlketone PEK Victrex®, polyetheretherketone PEEK Victrex®, polyetheretherketoneketone PEEKK, polyetherketoneetherketone ketone PEKEKK Ultrapek®

Polyethersulfones like polysulfone Udel®, polyphenylsulfone Radel R®, Polyetherethersulfone Radel A®, polyethersulfone PES Victrex®

Poly (Benz) imidazole like PBI Celazol® and others the (Benz) imidazole-group containing oligomers and polymers, in which the (Benz) imidazole group can be available in the main chain or in the polymer lateral chain Polyphenyleneether like e.g. poly(2,6-dimethyloxyphenylene), poly(2,6-diphenyloxyphenylene)

Polyphenylenesulfide and copolymers

Poly(1,4-phenylene) or Poly (1,3-phenylene), which can be modified in the lateral. group if necessary with benzoyl, naphtoyl or o-phenyloxy-1,4-benzoyl group, m-phenyloxy-1,4-benzoyl group or p-phenyloxy-1,4-benzoyl group.

Polybenzoxazole) and copolymers
Polybenzthiazole) and copolymers
Polyphtalazinone) and copolymers
Polyaniline and copolymers
Polythiazole
Polypyrrole (2) Polymer of the type A (polymer with cation exchange group or the non-ionic precursors): The polymer type A comprises all polymers which consist of the above-mentioned polymer main chains (1) and the following cation exchange groups or their non-ionic precursors: $SO_3H$, $SO_3Me$; $PO_3H_2$, $PO_3Me_2$; COOH, COOMe $SO_2X$, $POX_2$, COX with X=Hal, $OR_2$, N $(R_2)_2$, anhydride radical, N-imidazol radical, N-pyrazole radical)

Preferred as functional groups are $SO_3H$, $SO_3Me$; $PO_3H_2$, $PO_3Me_2$ or $SO_2X$, $POX_2$. The strongly acidic sulfonic acid groups or their non-ionic precursors are particularly preferred as functional groups. As polymer main chains aryl main chain polymers are preferred. Poly(etherketone) and poly(ethersulfone) are particularly preferred.

(3) Polymers of the type B (polymers with IV-basic groups and/or anion exchange groups): The polymer type B comprises all polymers which consist of the above-mentioned polymer main chains (1) and carry the following anion exchange groups or their non-ionic precursors (with primary, secondary, tertiary basic N):
$N(R_2)_3+Y-$, $P(R_2)_3+Y$, whereby the $R_2$ radicals can be the same or different from each other; $N(R_2)_2$ (primary, secondary or tertiary amines);
Polymers with the N-basic (her) aryl and heterocyclic groups shown in illus. 2.

As polymer main chains (het) aryl main chain polymers like poly (etherketone), poly (ethersulfone) and poly (benzimidazole) are preferably. As basic groups, primary, secondary and tertiary amino groups, pyridine group and imidazole group are preferred.

(4) Polymers of the type C polymers with cross-linking groups like sulfinate group and/or unsaturated groups):
The polymertyp C comprises all polymers which consist of the above-mentioned polymer main chains (1) and cross-linking groups. Cross-linking groups are, for example:
4 a) Alkene groups: Polymer C $(R_{13})=C (R_{14}R_{15})$ with $R_{13}$, $R_{14}$, $R_{15}=R_2$ or $R_4$
4 b) Polymer Si $(R_{16}R_{17})$ H with $R_{16}$, $R_{17}=R_2$ or $R_4$
4 c) Polymer-COX, polymer-$SO_2X$, polymer-$POX_2$
4 d) Sulfinate group polymer-$SO_2Me$
4 e) Polymer N $(R_2)_2$ with $R_2 \neq H$.

One of the mentioned cross-linking groups or several of the mentioned cross-linking groups can lie on the polymer main chain. The cross-linking can be carried out by the following literature known reactions:
(I) Group of 4 a) by addition of peroxides;
(II) Group of 4 a) with group of 4 b) under Pt catalysis via hydrosilation;
(III) Group 4d) with dihalogenalkane or dihalogenaryl crosslinkers (for e.g. Hal—$(CH_2)_x$—Hal, x=3-20) with S-alkylation of the sulfinate group;
(IV) Group 4e) with dihalogenalkane or dihalogenrryl crosslinkers (for e.g. Hal—$(CH_2)$—Hal, x=3-20) with alkylation of the tertiary basic N-group
(V) Group 4d) and group 4e) with dihalogenalkane or dihalogenaryl crosslinkers (for e.g. Hal—$(CH_2)_x$—Hal, x=3-20) with S-alkylation of the sulfinate group and alkylation of the tertiary basic N -
(VI) Group of 4 c) by reaction with diamines.

The cross-linking reactions (III) and (IV) and (V) are preferred, particularly the cross-linking reaction (III).

(5) Polymers of the type D (polymers with cation exchange groups and anion exchange groups and/or basic N groups and/or cross-linking groups):
The polymertyp D comprises polymers which contain the above-mentioned polymer main chains (1) and which can carry miscellaneous groups: the cation exchange group listed in (2) or their non-ionic precursor and the anion exchange group listed in (3) or primary, secondary or tertiary N-basic groups and/or the cross-linking groups listed in (4).

The following combinations are possible:
Polymer D1: Polymer with cation exchange groups or their non-ionic precursors and with anion exchange groups and/or N-basic groups
Polymer D2: Polymer with cation exchange groups or their non-ionic precursors and with cross-linking groups
Polymer D3: Polymer with anion exchange groups and/or N-basic groups and with cross-linking groups
Polymer D4: Polymer with cation exchange group or their non-ionic precursors and with anion exchange groups and/or N-basic groups and with cross-linking groups In the following will be described how stretched films containing an inorganic particle-shaped component (B) will be posttreated such that membranes are available for fuel cell applications, alkene alkane separation, electrodialysis, reverse osmosis, dialysis, pervaporation, electrolysis and other membrane applications.

A fusible stretchable polymer e.g. polypropylene is compounded with an inorganic particle-shaped component (B), preferably a component containing layer structures and/or framework structures, particularly a phyllosilicate and/or tectosilicate with an average particle size of 5-10μ. By compounding is understood: The polymer is intimately mixed in a melt state with the inorganic component, here, the silicate. A common method is mixing the components in the twin-screw extruder. As a result one obtains a composite, here silicate into polypropylene. The bentonite montmorillonite is used exemplarily as a silica containing component subsequently. However, this does not mean any special restriction on bentonites.

The film is stretched now according to known methods as described further above.

The stretched foil represents now a micro porous membrane. The pore size is dependent on the grain size, elongation properties of the polymer and of the tractive forces which were used during the stretching. As a dense membrane it is completely useless. Gasses e.g. penetrate roughly unhindered through.

For the membranes of the present invention organically modified clay or zeolite is used. Bentonites are clays and montmorillonite is a special bentonite. Montmorillonite is preferred. However, all other substrats into which low molecular compounds can intercalate can also be used. Montmorillonite is able to tie molecules to itself by intercalation. Montmorillonite is modified such that a strongly basic component juts out of the particle or is on the particle surface. This organic modification is prior art. The organic component is preferably containing nitrogen. Heterocycles are particularly preferred and among those imidazoles and guanidine derivatives. This shall not mean any restriction to these two substance classes. Every other substance class which contains a strong endstanding base is also possible.

This organically modified montmorillonite is compounded with the polymer, extrudated to a foil and after that stretched. In the case of polypropylene, up to 70% by weight can be easily incorporated. Particularly preferred are 50-60% by weight. As a result a micro porous stretched film with clay particle is obtained which carries imidazole groups on its surface. This film is now posttreated with phosphoric acid. The phosphoric acid penetrates into the film and forms a compound with the imidazole groups. Furthermore still existing cavities both in the inorganic particle and outside are filled with phosphoric acid. The film has become now a dense proton-conducting membrane and is already usable in this condition in a fuel cell such as.

To seal up further the membrane against the "bleeding" of the phosphoric acid, the membrane is dipped into zirconium oxychloride solution according to the present invention. An insoluble zirconium phosphate is precipitated at the phase boundary to the membrane and in the membrane itself. The membrane is further sealed up by this process. Zirconium phosphates support proton conductivity. This membrane is suitable for use in the fuel cell.

When using thermoplastics as a polymer component, such as polysulfone or Vectra 950 ® (of Ticona), the membrane formed from it is applicable for the PEM fuel cell. Also for temperatures above 80° C.

It is the advantage of the procedure of the present invention that the film is extruded and is not drawn out of a solvent.

The above-mentioned procedure with a polymer stretched to a film, organically modified clay, imidazole, phosphoric acid and after that partial precipitation to zirconium phosphate is only an exemplary special example of the fundamental invention.

A second path is created in the film through the stretching. The polymer component (A) of which the film consists represents the first path itself The cavities or the pores which have arisen from the stretching procedure are the second path. As a path a continuous way from one side to the other shall be understood. A real percolation must be possible so that the way is continuous. That is water vapour e.g. must be able to penetrate from one side to the other side. If the cavity is filled, then the properties of the new path are dependent on the "filler". If the filler is ion conducting, then the complete path is ion conducting. It is important that the path is continuous. The film before the stretching can be produced by extrusion. However, it is also possible to produce the film out of a solvent.

The production of the film with the modified or unmodified bulking agent out of a solvent is prior art.

The extrusion presupposes a melting of the polymer. Most of the functionalised polymers can not be extruded without considerable disadvantages. If the polymer contains sulfonic acid groups or chemical precursors like sulfochlorides, it degenerates before it melts. In such cases the production is preferred through a solvent containing process.

The properties of the two paths can be modified over an almost arbitrary range. It is a problem in fuel cell engineering that proton conductivity works below 80° C. with hydrated membranes works particularly well (e.g. Naflon®). Above this temperature water is lost increasingly and the proton conductivity and with that the performance drops as a consequence. According to prior art it has been attempted to solve this problem by producing composite materials from a polymer and an inorganic bulking agent which is also proton conducting or supports proton conductivity. The problem is that the individual paths, that is inorganic bulking agent or organic ionomer are not independently of each other continuous from one side of the membrane to the other side of the membrane.

Stepping up from prior art and according to the present invention a membrane is produced. It contains a water-dependent polymeric proton-conductor, e.g. a polymeric sulfonic acid and an inorganic component which, if necessary, has been organically modified before. This film is now stretched and the resulting second path is filled with an at higher temperature T>80° C.) proton conducting substance. The filling can be obtained e.g. by alternating post-treatment of the microporous membrane in phosphoric acid and zirconium oxychloride (ZrOCl2). This process can be repeated so often until no further zirconium phosphate precipitates in the membrane. However, the precipitation of zirconium phosphate is only one possibility. E.g. a sulfonated polyetherketone or polysulfone is used as polymer.

As a result one gets a membrane which has two continuous proton conducting paths. Below 80° C. the proton conductivity works predominantly through polymer sulfonic acid swollen in water and in the temperature range above through the inorganic proton conductor. A fluent transition takes place.

In another embodiment the concept of the two paths is reduced to an unfinished microporous membrane which is adapted in a second modification step to the desired application. There are two membranes which are joined together to one without that they disturb themselves in their membrane function. Another clear picture is a textile substance woven from two threads with different colour. Whereby the threads can be choosen in a very broad range. However, one of the threads is inserted in the finished homogeneous fabric afterwards.

The procedure is exemplarily once again schematically described in the particular preferably case, that the component (A) is a without degradation fusible polymer and that the particle-shaped component (B) is a phyllosilicate or tectosilicate with an average size of 0.1 to 15μ. A microporous film is obtained by extrusion of a composite, which contains the components (A) and (B), and subsequent stretching. This microporous foil is posttreated in a solution with molecules which have at least two functional groups in the same molecule. One of the functional groups in the molecule has a positive charge, preferably this is a positively charged nitrogen atom. The positively charged nitrogen intercalates in the layer structures or framework structures of the silicate. A cation exchange takes place. A nitrogen cation also results from protonation of a primary, secondary or tertiary nitrogen e.g. by the acidic silicate which intercalates into the silicate. The cation exchange at the silicate can, as mentioned already further above, take place completely or partly. The resulting membrane is for certain membrane applications as alkene alkane separation already sufficiently sealed up. The remaining functional group not intercalated in the phyllosilicate or tectosilicate can be a precursor of an ion conducting group. For example sulfonic acid chlorides, carbonic acid chloride or phosphonic acid chlorides. Further examples of precursors of cations or anion exchange groups are given above. These precursors are converted in further posttreatment in a group supporting the selective permeation. E.g. this is a hydrolysis in the case of the sulfonic acid halides which takes place in the acidic, neutral or alkaline medium. To seal the film up further, the stretched film is now alternatingly spiked with a multivalent metal salt, e.g. $Ti^{4+}$, $Zr^{4+}$, $Ti^{3+}$, $Zr^{3+}$, $TiO^{2+}$, $ZrO^{2+}$, and an acid, which can be low or high molecular. As acids phosphoric acid and sulphuric acid diluted with water are particularly preferred. The phosphoric acid has a concentration of 1-85% by weight. Preferred is a concentration from 20 to 80% by weight. The sulphuric acid has a concentration from 1 to 80% by weight. A concentration from 20 to 50% by weight is preferred.

The process of precipitation of a hardly soluble proton conductor in the membrane can be repeated severalfold.

Any substance can be used as an inorganic component which on stretching has the consequence that free cavities form around this substance (see illus. 1: Process of the cavity formation by stretching). It is not mandatorily necessary either that the component must be inorganic. The only condition, as said already, is that void space has formed around the particle after the stretching. The stretching can be carried out monoaxially or also biaxially. A biaxial stretching is preferred. For the application in hollow fibers, however, a monoaxial stretching is sufficient.

Additionally stretching is possible also over the third direction in space, that is triaxially. For this purpose e.g. the composite extruded to the film is hold level above vacuum nozzles and a plate which also can draw a vacuum through small pores touches down from above. The film is now fixed between two plates. If one pulls the two plates out of each other under applied vacuum and chooses the distance such, that the film does not break but stretches only, a film is obtained that was stretched in thickness.

Further application finds the invention in electrodialysis.

The microporous stretched membrane consists of a cation exchanger and the second path consists of an anion exchanger, if necessary with proton leaching, e.g. as described in DE 19836514 A1 (Illus. 3; Drawings page 2). Is this membrane is placed in an electrical field, the water in it dissociates into protons and hydroxyl ions. The protons move along the cation exchange path to the cathode and the hydroxyl ions (OH—) move along the anion exchange path to the anode in accordance with the electrical field. This way membranes can be established very economically and simply for electrodialysis.

However, the paths also can be exchanged. An anion exchange membrane or a chemical precursor of the anion exchange group is then stretched first and the second path is now a cation exchange membrane. The modification of the inorganic component must be chosen correspondingly.

An advantage of the invention has been mentioned only briefly before. Ionomers can not be extruded as a rule. So Nafion® cannot be extruded without plasticisers. The plasticiser (aid to the extrusion) is later very difficult to remove from the membrane. However, this is necessary for the operativeness of the membrane.

Organically modified particles (e.g. montmorillonite) can be processed according to the present invention in fusible and therefore extrudable polymers to films. In the second step the continuous path is formed by the stretching and then filled with the ion conductor.

By particle-shaped inorganic layer structures or framework structures containing the component (B) an otherwise under the application conditions of a membrane mobile or volatile functional groups carrying chemical substance of the general formula for hydrophobisation functionalisation agents (I) or (II) is fixed in the microporous film over a technically applicable time period so that it can be used for membrane applications.

This allows an enormous reduction in the production costs. Large areas of a "rawly" membrane can be produced in large existing plants, which are modified depending on the application in a second step. So membranes are very economically producible according to this procedure for the desalination of sea water. E.g. polypropylene is used as a basic polymer here. The inorganic component, e.g. montmorillonite, is modified organically before such that a charged group remains at the surface. E.g. this can be done with an alpha-omega amino sulfonic acid. After the stretching a loaded micro porous membrane results. This is suitable for reverse osmosis.

Furthermore cross-linking reactions can still be carried out within the pores through endstanding groups of the functionalisation agents capable of crosslinking. This can be a covalent and/or an ionic cross-link.

Another application is the use in the alkene alkane separation.

Nitrogen in heterocycles with a free electron pair forms with silver ions, e.g. silver nitrate solution, a hardly soluble complex. It has now been found surprisingly that if this complex is located in a membrane, it is capable to bind alkenes reversibly.

A film is made from polybenzimidazole and soaked in a diluted to concentrated silver salt solution, preferred is silver nitrate, over a period of 24 hours up to two weeks, then this membrane has a separation efficiency on alkene alkane mixtures. As a solvent for the silver salt water or an aprotic solvent can be used. Alkenes and olefines permeate through such a membrane anhydrously with a technically applicable flow rate. An improvement in the flow number is reached by insertion of organically modified montmorillonite with heterocyclical nitrogen on the surface, bearing at least a free electron pair, e.g. an endstanding imidazole group. The membrane is stretched carefully and soaked after this in silver salt solution. By the stretching channel structures which make the transport easier are produced in the membrane.

A considerable cost reduction is obtained if a unmodified polymer, e.g. polypropylene is stretched with organically modified montmorillonite. The montmorillonite carries again endstanding imidazole or pyridine groups on its surface. After the stretching the microporous membrane is soaked in a silver ion containing solution. After this the membrane is suitable for the alkene alkane separation. The membrane is suitably for the separation of low molecular substances, of which one component of the mixture contains a double bond, which forms a reversible complex with silver ions. The separation of low molecular olefine/alkane mixtures is particularly preferred.

The montmorillonite does not have to be modified compulsorily. Polypropylene is compounded with montmorillonite and stretched. After this the porous film is posttreated with a solution containing aromatic nitrogen bearing at least one free electron pair. The solvent can be any suitable solvent or solvent mixture. Water and aprotic solvents are preferred. It is only important that the corresponding molecule containing nitrogen penetrates into the cavities of the clay and fills out the pores. In the following step the membrane is posttreated in a silver or copper ion containing solution. Any solvent is suitably that holds silver ions or copper ions in solution. Particularly preferred is water and aprotic solvents such as DMSO, NMP and THF. As a consequence the nitrogen silver ion complex or the nitrogen copper ion complex precipitates in the membrane. This process can if necessary be repeated severalfold. The membrane is now suitable for the anhydrous alkene alkane separation.

The invention claimed is:

1. A process for forming a membrane, comprising:
Providing a foil containing 20 to 98% by weight of a polymer component (A) and 80 to 2% by weight of a particle component (B), which comprises phyllosilicates or tectosilicates distributed in the matrix of the polymer component (A) and having a mean particle diameter of 0.1 to 15 µm;
Stretching the foil monoaxially or biaxially to provide cavities in the foil;
filling the cavities using a process that includes replacing the cations of the phyllosilicates or the tectosilicates completely or partially by organic functionalizing hydrophobization agents and post-treating with phosphoric acid to fill the cavities in the foil.

2. A process as in claim 1, wherein the organic functionalizing hydrophobization agents have a general formula:

Or wherein the substituents R1, R2, R3, R4 each represent a hydrogen atom, a straight chain, branched, or a saturated or nonsaturated hydrocarbon radical with 1 to 40 carbon atoms; X represents phosphorus, nitrogen or carbon, Y represents oxygen or sulphur, and Z represents an anion; and n is an integer number from 1 to 5.

3. A process as in claim 1, wherein the organic functionalizing hydrophobization agents have a general formula:

Or wherein the substituents R1, R2, R3, R4 each represent a hydrogen atom, a straight chain, branched, or a saturated or nonsaturated hydrocarbon radical with 1 to 40 carbon atoms; X represents phosphorus, nitrogen or carbon, Y represents carbon, with one or more of the radicals R1, R2 or R3 being double-bonded at the carbon atom, Z represents an anion; and n is an integer number from 1 to 5.

4. A process as in claim 2, wherein the saturated or nonsaturated hydrocarbon radical has 1 to 20 carbon atoms.

5. A process as in claim 2, wherein the saturated or nonsaturated hydrocarbon radical carries a functional group, or wherein two of the radicals are linked together to form a heterocyclic radical with 5 to 10 carbon atoms, and one or more N atoms.

6. A process as in claim 1, wherein the polymer component (A) is selected from the group consisting of a polyolefine, polyethylene, polypropylene, polyisobutylene, polynorbornene, polymethylpentene, poly(1,4)-isoprene, poly(3,4)-isoprene, poly (1,4)-butadiene, poly(1,2)-butadiene, a styrene(co)polymer like polystyrene, poly (methylstyrene), poly (trifluorostyrene), poly(pentafluorostyrene), an N-basic polymer such as polyvinylcarbazole, polyethyleneimine, poly(2)-vinylpyridine, poly(3)-vinylpyridine, poly(4)-vinylpyridine, a (het)aryl main chain polymer, polyetherketone (PEK), polyetheretherketone (PEEK), polyetheretherketoneketone (PEEKK), polyetherketoneetherketone ketone (PEKEKK), polyethersulfone, polysulfone, polyphenylsulfone, polyetherethersulfone, polyethersulfone (PES), a poly (benz)imidazole (PBI), polyphenyleneether, poly(2,6)-dimethyloxyphenylene, poly(2,6)-diphenyloxyphenylene, polyphenylenesulfide, a perfluorinated polymer and a copolymer of two or more polymers of the group.

7. A process as in claim 1 wherein the foil further comprises, at a time prior to the stretching, a residual content of a solvent, and wherein the solvent is a solvent for the component A only.

8. A process as in claim 7, wherein the residual content of the solvent is in the range of 2 to 30% by weight.

9. A process as in claim 8, wherein the solvent is water or an aprotic solvent selected from the group consisting of tetrahydrofuran, dimethyl sulfoxide, N-methylpyrrolidone, sulfolane and dimethylacetamide.

10. A process as in claim 7, wherein the stretching is carried out at a temperature that is higher than the melting point of the solvent.

11. A process as in claim 1, the functionalising hydrophobation agents each contain a functional group selected from the group consisting of hydroxyl groups, nitro groups, carboxyl groups, phosphonic acid groups or sulfonic acid groups or their non-ionic precursors.

12. A process as in claim 11, wherein the non-ionic precursors are selected from the group consisting of sulfonic acid chlorides and carbonic acid chlorides.

13. A process as in claim 1, wherein the polymer component (A) comprises a cation exchange group, an anion exchange group or their non-ionic precursor.

14. A process as in claim 1, wherein the polymer component (A) Polymer component (A) a cross linking group selected from sulfinate groups or unsaturated groups.

15. A process as in claim 2, wherein the particle component (B) is modified with triphenyl methane dyes or their non-oxidised precursor, and wherein the triphenyl methane dyes are functionalised as the hydrophobisation agents of the general formula.

16. A process as in claim 1, further comprising post-treating the foil by organic modification, alternating with a multivalent metal salt and a low molecular or high molecular acid.

17. A process as in claim 16, wherein the multivalent metal salt is selected from the group consisting of $Ti^{4+}$, $Zr^{4+}$, $Ti^{3+}$, $Zr^{3+}$, $TiO^{2+}$ and $ZrO^{2+}$.

18. A process as in claim 1, further comprising post-treating the foil by organic modification, alternating with phosphoric acid (1 to 85%) and a solution of zirconiumoxychloride.

19. A process as in claim 1, further comprising post-treating the foil by organic modification using phosphoric acid (1 to 85%) or sulfuric acid (1 to 80%).

20. A process as in claim 1, further comprising post-treating the foil with a solution containing silver ions or copper ions.

21. A process as in claim 1, further comprising treating one or more surfaces of the foil with a corona discharge or a plasma.

22. A process as in claim 1, wherein laminating or coating the foil, using a solvent or a layer of a polymer or a polymer mixture.

23. A process as in claim 22, wherein the polymer carries functional groups.

24. A dense membrane formed using a process comprising:

providing a foil containing 20% to 98% by weight of a polymer component (A) and 80% to 2% by weight of a particle component (B), which comprises phyllosilicates or tectosilicates distributed in the matrix of the polymer component (A) and having a mean particle diameter of 0.1 μm to 15 μm;

Stretching the foil monoaxially or biaxially to provide cavities in the foil, filling the cavities using a process that includes replacing the cations of the phyllosilicates or the tectosilicates completely or partially by organic functionalizing hydrophobization agents and post-treating with phosphoric acid to fill the cavities in the foil.

25. A membrane as in claim 24, wherein the organic functionalizing hydrophobization agents have a general formula:

Or wherein the substituents R1, R2, R3, R4 each represent a hydrogen atom, a straight chain, branched, or a saturated or nonsaturated hydrocarbon radical with 1 to 40 carbon atoms, optionally including a functional group; X represents phosphorus, nitrogen or carbon, Y represents oxygen or sulphur, and Z represents an anion; and n is an integer number from 1 to 5.

26. A membrane as in claim 24, wherein the organic functionalizing hydrophobization agents have a general formula:

Or wherein the substituents R1, R2, R3, R4 each represent a hydrogen atom, a straight chain, branched, or a saturated or nonsaturated hydrocarbon radical with 1 to 40 carbon atoms, optionally including a functional group; X represents phosphorus, nitrogen or carbon, Y represents carbon, with one or more of the radicals R1, R2 or R3 being double-bonded at the carbon atom, and Z represents an anion; n is an integer number from 1 to 5.

27. A membrane as in claim 25, wherein the saturated or nonsaturated hydrocarbon radical has 1 to 20 carbon atoms.

28. A membrane as in claim 25, wherein the saturated or nonsaturated hydrocarbon radical carries a functional group, or wherein two of the saturated or nonsaturated hydrocarbon radicals are linked together to form a heterocyclic radical with 5 to 10 carbon atoms, and one or more N atoms.

29. A membrane as in claim 24, wherein the polymer component (A) is selected from the group consisting of a polyolefine, polyethylene, polypropylene, polyisobutylene, polynorbornene, polymethylpentene, poly(1,4)-isoprene, poly(3,4)-isoprene, poly (1,4)-butadiene, poly(1,2)-butadiene, a styrene(co)polymer like polystyrene, poly (methylstyrene), poly(trifluorostyrene), poly(pentafluorostyrene), an N-basic polymer such as polyvinylcarbazole, polyethyleneimine, poly(2)-vinylpyridine, poly(3)-vinylpyridine, poly (4)-vinylpyridine, a (het)aryl main chain polymer, polyetherketone (PEK), polyetheretherketone (PEEK), polyetheretherketoneketone (PEEKK), polyetherketoneetherketone ketone (PEKEKK), polyethersulfone, polysulfone, polyphenylsulfone, polyetherethersulfone, polyethersulfone (PES), a poly(benz)imidazole (PBI), polyphenyleneether, poly(2,6)-dimethyloxyphenylene, poly (2,6)-diphenyloxyphenylene, polyphenylenesulfide, a perfluorinated polymer and a copolymer of two or more polymers of the group.

30. A membrane as in claim 24 wherein the foil further comprises, at a time prior to the stretching, a residual content of a solvent, and wherein the solvent is a solvent for the component A only.

31. A membrane as in claim 30, wherein the residual content of the solvent is in the range of 2 to 30% by weight.

32. A membrane as in claim 31, wherein the solvent is water or an aprotic solvent selected from the group consisting of tetrahydrofuran, dimethyl sulfoxide, N-methylpyrrolidone, sulfolane and dimethylacetamide.

33. A membrane as in claim 24, wherein the stretching is carried out at a temperature that is higher than the melting point of the solvent.

34. A membrane as in claim 25, wherein the functionalising hydrophobation agents each contain a functional group selected from the group consisting of hydroxyl groups, nitro groups, carboxyl groups, phosphonic acid groups or sulfonic acid groups or their non-ionic precursors.

35. A membrane as in claim 34, wherein the non-ionic precursors are selected from the group consisting of sulfonic acid chlorides and carbonic acid chlorides.

36. A membrane as in claim 24, wherein the polymer component (A) comprises a cation exchange group, an anion exchange group or their non-ionic precursor.

37. A membrane as in claim 24, wherein the Polymer component (A) comprises a cross linking group selected from sulfinate groups or unsaturated groups.

38. A membrane as in claim 25, wherein the particle component (B) is modified with triphenyl methane dyes or their non-oxidised precursor, and wherein the triphenyl methane dyes are functionalised as the hydrophobisation agents of the general formula.

39. A membrane as in claim 24, wherein the process further comprises post-treating the foil by organic modification, alternating with a multivalent metal salt and a low molecular or high molecular acid.

40. A membrane as in claim 39, wherein the multivalent metal salt is selected from the group consisting of $Ti^{4+}$, $Zr^{4+}$, $Ti^{3+}$, $Zr^{3+}$, $TiO^{2+}$ and $ZrO^{2+}$.

41. A membrane as in claim 24, wherein the process further comprises post-treating the foil by organic modification, alternating with phosphoric acid (1 to 85%) and a solution of zirconiumoxychloride.

42. A membrane as in claim 24, wherein the process further comprises post-treating the foil by organic modification using phosphoric acid (1 to 85%) or sulfuric acid (1 to 80%).

43. A membrane as in claim 24, wherein the process further comprises post-treating the foil with a solution containing silver ions or copper ions.

44. A membrane as in claim 24, wherein the process further comprises treating one or more surfaces of the foil with a corona discharge or a plasma.

45. A membrane as in claim 24, wherein the foil is laminated or coated using a solvent or a layer of a polymer or a polymer mixture.

46. A membrane as in claim 45, wherein the polymer carries functional groups.

* * * * *